United States Patent [19]
Takahashi et al.

[11] 3,784,366
[45] Jan. 8, 1974

[54] METHOD FOR PROMOTING FORMATION OF FRUIT ABSCISING LAYER

[75] Inventors: Shogo Takahashi, Tokyo; Takayasu Yamada, Fujisawa; Hiromi Okudaira, Soka, all of Japan

[73] Assignee: Sankyo Company Limited, Tokyo, Japan

[22] Filed: Dec. 17, 1971

[21] Appl. No.: 209,403

[30] Foreign Application Priority Data
Dec. 27, 1970   Japan.............................. 45/127181

[52] U.S. Cl............................ 71/90, 71/86, 71/88
[51] Int. Cl............................................ A01n 9/12
[58] Field of Search......................... 71/90, 74, 92; 424/255

[56] References Cited
UNITED STATES PATENTS

| | | | |
|---|---|---|---|
| 3,522,031 | 7/1970 | Miller | 71/74 |
| 3,321,293 | 5/1967 | Sousa | 71/74 |
| 2,392,518 | 1/1946 | Barnhill | 71/90 |
| 3,472,735 | 10/1969 | Nishikawa et al. | 424/255 |
| 3,432,504 | 3/1969 | Goetze-Claren | 424/255 |
| 2,205,807 | 6/1940 | Bjorksten | 71/90 |

*Primary Examiner*—Glennon H. Hollrah
*Attorney*—Toren and McGeady

[57] ABSTRACT

Fruit abscising compositions for facilitating the harvest of fruits, especially citrus fruits, which comprises as an active ingredient at least one thiamine derivative selected from the group consisting of
  thiamine esters and their salts with inorganic acids; and
  S-acyl and disulfide derivatives of thiol-type thiamines, their esters and their salts with inorganic acids
and an agriculturally-acceptable carrier.

1 Claim, No Drawings

METHOD FOR PROMOTING FORMATION OF FRUIT ABSCISING LAYER

This invention relates to a new use of certain thiamine derivatives as a fruit abscising agent.

More particularly, this invention relates to a fruit abscising composition for facilitating the harvest of fruits which comprises as an active ingredient at least one compound selected from the group consisting of thiamine esters and their salts with inorganic acids; and S-acyl and disulfide derivatives of thiol-type thiamines, their esters and their salts with inorganic acids and an agriculturally-acceptable carrier.

The term "thiamine ester" as used herein means to refer to the corresponding O-acyl thiamine derivative.

Also, it is connected with a method for facilitating the harvest of fruits by accelerated abscission layer formation which comprises applying to fruited trees an effective amount to accelerate fruit abscission of at least one compound selected from the thiamine derivatives as specified hereinabove.

Heretofore, in many countries various fruits, for example, orange, lemon, olive, plum, chestnut, grape and the like have been principally harvested by hand with a great number of farm labours and it has been a long-pending problem in the art to effectively save the labour for gathering of ripe fruits. Some previous attempts have been made to attain such purpose. For instance, mechanical vibration was applied to fruited trees in branches, main braches and/or twigs thereof by means of a specific vibrator, thereby to cause the fruits to fall off. However, this prior method was not satisfactory since the harvested fruits and the vibrated branches and leaves of the tree were sometimes seriously damaged through forced mechanical power.

On the other hand, although another attempt was made wherein a chemical agent was applied to fruited trees a, completely favourable result was not obtained because of simultaneous occurrence of the fall of leaves and the appearance of an adverse effect on the harvested fruits during storage.

As a result of our extensive studies to develop a new and effective fruit abscising agent, it has been unexpectedly found that the above-defined thiamine derivatives exert a superior biological effect to accelerate the formation of an abscission layer between the stem and the fruit adherent thereto in a fruit tree, which leads to the facilitation of the falling of the fruit to be harvested, without the prior art disadvantages, and the present invention is based upon the discovery set forth just hereinabove.

It is, accordingly, an object of this invention to provide a new and unique fruit abscising composition which comprises as an active ingredient at least one of the specific thiamine derivatives and an agriculturally-acceptable carrier.

It is another object of this invention to provide a new and valuable method for the facilitation of the harvest of fruit which comprises applying to fruited trees an effective amount of the above-defined thiamine derivatives.

These and other objects of this invention will become apparent from the following detailed description.

The active ingredients which may be employed in this invention, i.e., the thiamine derivatives as specified above are all known in the art and they may be readily prepared according to any of conventional techniques known per se.

Representative examples of the active ingredient in this invention are listed below, but they are not intended to be limiting the scope of this invention.

| No. of Compound | Chemical Name |
|---|---|
| 1. | thiamine monophosphate |
| 2. | thiamine diphosphate |
| 3. | thiamine triphosphate |
| 4. | S-benzoyl-thiamine-O-monophosphate |
| 5. | S-(2-hydroxybenzoyl)-thiamine-O-monophosphate |
| 6. | S-benzoyl-thiamine-O-acetoxyacetate |
| 7. | S-benzoyl-thiamine-O-γ-ethoxybutyrate |
| 8. | S-(2-furoyl)-thiamine-O-acetoxyacetate |
| 9. | thiamine propyl disulfide |
| 10. | thiamine tetrahydrofurfuryl disulfide |
| 11. | thiamine-O-monophosphate disulfide |
| 12. | carbothiamine(N-[(4-amino-2-methyl-5-pyrimidinyl)methyl]-N-[1-(2-oxo-1,3-oxathian-4-ylidene)ethyl]formamide) |

The ester components of the active thiamine derivatives in this invention may be any of those capable of constituting an ester portion of various known thiamine ester derivatives, but the phosphates are preferred in view of their activities. Among the above-listed thiamine derivatives, advantageously employed is the derivative number 4, i.e., S-benzoyl-thiamine-O-monophosphate.

The inorganic acid which may constitute a salt with the active thiamine derivative may also be any of those acids commonly utilized in the art for the formation of various therapeutically active thiamine salts, but illustrative of the inorganic acid are hydrochloric, sulfuric and nitric acids.

In preparing the present fruit abscising composition, the active thiamine derivatives as set forth above may be conveniently formulated according to a known means into various forms, including liquids, dusts, wettable powders and the like.

Liquids may be prepared by dissolving or suspending the active compound in an agriculturally-acceptable liquid carrier, i.e., a suitable solvent with or without one or more of known adjuvants commonly employed in the art, such as, emulsifying agents, wetting agents, or dispersing agents. Suitable solvents include water, alcohols, such as, methanol or ethanol, acetone, benzene, toluene, xylenes, solvent naphtha, petroleum ether, the mixture thereof and the like. Suitable adjuvants may be any of those which is ordinarily employed in the art, and include, for example, the condensation products of alkylene oxides with phenols or organic acids, alkylarylsulfonates, dialkyl sulfosuccinate, polyoxyethylene ether or ester derivatives of alcohols or acids and the like.

Dusts may be prepared by admixing said active compound with an inert agriculturally-acceptable solid carrier by a conventional procedure. Suitable solid carriers for use in this invention include, for example, talc, pyrophylite, kieselguhr, clay, bentonite, diatomaceous earth, kaolin, precipitated chalk and the like.

Wettable powders may be prepared by mixing said active compound with one or more of the aforementioned solid carriers and suitable dispersing agents. Suitable dispersing agents include, for example, those aforementioned adjuvants, such as, alkylbenzenesulfonates, lignosulfonates or polyoxyalkylene glycol ethers or esters.

Other preparations may be suitably formed by those skilled in the art according to the prior art teachings.

The concentration of the active compound in the finished composition of this invention may be usually within the range of about 0.1 to about 98 percent by weight, and preferably of about 1.0 to about 70 percent by weight, based upon the total weight of the finished composition. The concentration of the active compound in the present composition ready for use may be usually of a lower range than that of the finished composition as mentioned just above and will largely depend upon such factors as the kind of fruit tree, the form of a composition of the specific active ingredient, the ripening degree of fruit and the like, usually about 0.001 to about 10 percent being employed.

It should be, however, understood that the amount of an active compound in the composition of this invention is not critical feature of this invention. Two or more of said active ingredients may be advantageously incorporated into the composition of this invention.

It should be avoided that other known agricultural chemicals, for example, insecticide, fungicide, acaricide and the like be incorporated into the present invention, if it would be expected that residual toxicity might appear in the harvested fruits.

The method for facilitating the harvest of fruit of this invention comprises applying fruited trees by uniformly spraying them on both sides of the leaves, branches, fruits and the like with an effective amount of the active compound to exert the desired effect of forming an abscission layer, usually before about 1 to 3 weeks of a possible harvest time. Then, a suitable-preferably constant-vibration is usually applied to the trees, for example, in the branches, main branches and/or stems thereof by means of a mechanical vibrator commonly employed in the art, thereby to cause the fruits fallen off.

The method of this invention may be conveniently applied to any of fruit trees, especially citrus trees such as mandarin orange tree (*Citrus Unshiu*), orange tree (*Citrus Natsudaidai*), Hassaku tree (*Citrus Hassaku*), navel orange tree and Valencia orange tree (*Citrus sinensis*), lemon tree (*Citrus Limon*); and stone fruit trees, such as, olive tree (*Olea europeaea*), cherry tree (*Prunus avium*), cherry plum tree (*Prunus cerasifera*), apricot tree (*Prunus Armeniaca*), plum tree (*Prunus Mume*), palm tree (*Phoenix dactylifera*), grape tree (*Vitis vinifera*), walnut tree (*Juglans mandshurica*); and the like.

It is also to be noted that many of the active thiamine derivatives in the present composition are known as therapeutic and nourishing agents in medicinal field and thus the active thiamine derivatives in this invention can be surely expected to show neither phytotoxicity against the fruit trees applied nor harmful effects upon human beings and domestic animals, accompanied with favourable storage of the treated and harvested fruits.

In order to demonstrate the superior fruit abscission effect of this invention and some specific embodiments of this invention, examples are given hereinbelow.

EXAMPLE 1

Three groups of mandarin orange trees (*Citrus Unshiu*) which were 60 years old and were bearing a great number of fruits were treated by uniformly spraying thereto a sufficient amount of one of the active compounds indicated below in the form of an aqueous solution or emulsion having the concentration of 1,000 ppm.

After 12 days of the treatment, constant vibration was applied to the tree in its branches by means of a conventional vibrator.

The numbers of falling fruits and of falling leaves in each group were measured, respectively, and the average falling rate of fruits and the average number of falling leaves were calculated.

The results are given in the following Table 1.

The damages in the fruit surface was no greater than that obtained with the prior hand-working.

TABLE 1.—MANDARIN ORANGE TREES

| Number of test compound [1] | Falling rate of fruits (percent)[2] | | | Holding rate of fruits [3] (percent) | Damage on the fruit [4] surface | Degree of falling leaves [5] |
|---|---|---|---|---|---|---|
| | Rate of fruits having abscission layers (percent) | Rate of fruits having incomplete abscission layers (percent) | Total | | | |
| 1 | 75.9 | 18.6 | 94.5 | 5.5 | ± | — |
| Mix.* | 84.5 | 3.4 | 87.9 | 12.0 | ± | ± |
| 4 | 98.3 | 1.2 | 99.5 | 0.5 | — | — |
| 5 | 85.7 | 3.2 | 88.9 | 10.2 | — | — |
| 6 | 57.8 | 22.9 | 80.7 | 19.3 | — | — |
| 7 | 66.7 | 25.6 | 92.3 | 7.7 | — | — |
| 8 | 64.3 | 25.2 | 89.5 | 10.5 | — | — |
| 9 | 78.5 | 9.7 | 88.2 | 11.8 | ± | — |
| 10 | 80.8 | 10.8 | 91.6 | 8.4 | ± | — |
| 11 | 94.5 | 3.1 | 97.6 | 2.3 | — | — |
| 12 | 80.0 | 9.7 | 89.7 | 10.3 | — | — |
| H₂O (control) | 34.0 | 25.4 | 59.4 | 40.6 | — | — |

*A mixture of No. 1, No. 2, and No. 3.
[1] The number of the test compound is the same as illustrated hereinabove.
[2] "Fruit having abscission layers" means the one that fell off from the tree by smooth separation from the fruit stem thereof without any damage. "Fruit having incomplete abscission layers" means to include those fruits having the damaged stems, the ones that fell off with the broken peels and the ones that fell off because of breakdown of the stems.
[3] "Holding rate of fruits" means a rate of fruits that do not fall off by a mechanical vibration but are harvested by hand at a harvesting stage.
[4] "Damage on the fruit surface" means a degree of phytotoxicity developing on the fruit surface by the test compound:
  —: No phytotoxicity was observed.
  ±: Only a few damaged oil foams on the fruit surface were observed.
  +: Damaged oil foams on the fruit surface were observed.
[5] "Degree of falling leaves" means a number of the leaves that fell off by a mechanical vibration:
  —: The same degree as observed in the control.
  ±: Somewhat higher degree than that observed in the control.

EXAMPLE 2

Four groups of plum trees (Prunus Mume: variety, Kobungo) 15 years of age and which were bearing a great number of fruits were treated with the active compound indicated below in the form of an aqueous solution or emulsion having the concentration of 1,000 ppm by uniformly spraying over the whole crown of the tree to a sufficient extent.

After 10 days of the treatment, constant vibration was applied to the tree in its main branches by means of a conventional vibrator.

The numbers of falling fruits and of falling leaves as well as remaining leaves were investigated, respectively.

The results are given in the following Table 2.

The attachment of the fallen fruit to the fruit stem as well as the damage upon falling were also observed.

TABLE 2

Plum Trees

| No. of test compound[1] | Falling rate of fruits % | Holding rate of fruits % | Attaching rate of fruit stems % | Rate of damaged fruits % | Degree of falling leaves[2] |
|---|---|---|---|---|---|
| 1 | 96.5 | 3.5 | 35.5 | 0 | — |
| Mix.* | 94.4 | 5.6 | 42.6 | 0.2 | — |
| 4 | 97.5 | 2.5 | 32.0 | 0.6 | — |
| H$_2$O (Control) | 72.2 | 27.8 | 73.8 | 2.8 | ± |

* a mixture of No. 1, No. 2 and No. 3
[1] The number of the test compound is the same as illustrated hereinabove.
[2] Degree of falling leaves is evaluated according to the following ratings;
—: only a few fallen leaves were observed.
±: about 100 fallen leaves were observed.
+: about 300 fallen leaves were observed.
++: about 500 fallen leaves were observed.

It will become apparent from the above results that the active compounds of this invention exhibit a high falling rate of mandarin orange fruits and plums as compared with that of the control.

We claim:
1. A method for facilitating the harvest of fruits by accelerated abscision layer formation which comprises applying to fruited trees an effective amount of a compound selected from the group consisting of:
thiamine monophosphate,
thiamine diphosphate,
thiamine triphosphate,
S-benzoyl-thiamine-O-monophosphate,
S-(2-hydroxybenzoyl)-thiamine-O-monophosphate,
S-benzoyl-thiamine-O-acetoxyacetate,
S-benzoyl-thiamine-O-γ-ethoxybutyrate,
S-(2-furoyl)-thiamine-O-acetoxyacetate,
thiamine propyl disulfide,
thiamine tetrahydrofurfuryl disulfide,
thiamine-O-monophosphate disulfide, and
carbothiamine.

* * * * *